Patented Feb. 28, 1950

2,498,928

UNITED STATES PATENT OFFICE 2,498,928

SEPARATION OF CYCLOPENTANE-NEOHEXANE MIXTURES BY AZEOTROPIC DISTILLATION WITH METHYL FORMATE

Gardner C. Ray, Bartlesville, Okla., assignor to Phillips Petroleum Company, a corporation of Delaware No Drawing. Application April 8, 1946,
Serial No. 660,400

3 Claims. (Cl. 202—42)

This invention relates to separation of cyclopentane-neohexane mixtures by azeotropic fractionation. In one particular aspect it relates to a process for the recovery of cyclopentane from admixture with neohexane and in another particular aspect it relates to methods for increasing the purity of neohexane containing cyclopentane as impurity.

By straight fractional distillation of Mid-Continent natural gasoline it is possible to separate a fraction which is essentially a binary mixture of cyclopentane and neohexane, containing cyclopentane in major proportion, usually about 80 to 90 volume per cent.

Both cyclopentane and neohexane are hydrocarbons of considerable value in the blending of aviation fuels. Each of these hydrocarbons is also used as an intermediate in chemical synthesis. The hydrocarbons as obtained in the above-mentioned fraction of natural gasoline are not sufficiently pure for many uses.

Separation of mixtures of cyclopentane and neohexane by ordinary fractional distillation is very difficult. Under a pressure of one atmosphere the boiling point of neohexane is 49.7° C. and that of cyclopentane is 49.3° C.; a difference of only 0.4° C. In addition to the fact that the vapor pressure ratio of the more volatile component (cyclopentane) to the less volatile component (neohexane) is very small, data hereinafter set forth in Example I indicate that neohexane and cyclopentane form an azeotrope. If the azeotrope exists, and if it boils very close to the boiling point of cyclopentane, the formation of such an azeotrope would greatly increase the difficulties encountered in attempting the separation of neohexane and cyclopentane by fractional distillation.

It is an object of this invention to provide a method for the separation of cyclopentane-neohexane mixtures by azeotropic distillation.

Another object of this invention is to provide an entraining agent for azeotropic distillation of cyclopentane-neohexane mixtures which is easily removable from hydrocarbons by washing with water.

A further object is to provide a method for the recovery of cyclopentane from a cyclopentane-neohexane mixture.

Other objects and advantages will become apparent to those skilled in the art as this disclosure proceeds.

I have discovered that cyclopentane and neohexane may be effectively separated by fractional distillation in columns of moderate efficiency by adding methyl formate to the mixture prior to distillation. I have discovered, further, that both cyclopentane and neohexane form minimum-boiling azeotropes with methyl formate. The cyclopentane-methyl formate azeotrope has a boiling point of 26.0° C. at 760 mm. pressure and a composition of 60 volume per cent methyl formate and 40 volume per cent cyclopentane. The neohexane-methyl formate azeotrope has a boiling point of 25.4° C. at 760 mm. pressure and a composition of 55 volume per cent methyl formate and 45 volume per cent neohexane.

When a mixture of neohexane and cyclopentane, with methyl formate in excess of the amount necessary to form azeotropes with all the hydrocarbon present, is fractionally distilled in a column having an insufficiency of plates to separate the two azeotropes sharply, all three compounds will be found in the overhead product. The composition of the overhead product will vary with the composition of the kettle product. Hence no ternary azeotrope is formed. The overhead product, however, will have a higher neohexane to cyclopentane ratio than the kettle product and therefore in a batchwise fractionation the kettle product will become progressively richer with respect to cyclopentane.

In a continuous process wherein a cyclopentane-neohexane feed is introduced in admixture with methyl formate into an intermediate point in a fractionation column a kettle product richer than the feed in cyclopentane is obtained while the overhead product will be richer in neohexane.

In such continuous process if the amount of methyl formate added to the feed be restricted to an amount just sufficient to form azeotropes with all hydrocarbons present other than a calculated quantity of kettle product of a given desired purity, a kettle product free from entrainer may be obtained. Such method of operation has the advantage of requiring no washing of the kettle product.

Separation of methyl formate entrainer from the hydrocarbons may be accomplished in a number of ways. Since methyl formate is soluble in water to the extent of 31 weight per cent at 68° F., water washing is a convenient means of removing this entrainer from overhead or kettle products.

Azeotropic fractionation of cyclopentane-neohexane mixtures with methyl formate is a more effective method of separating these two hydrocarbons than ordinary straight fractional distillation.

Examples I and II are given to illustrate this fact.

In Example I it is shown that ordinary straight fractionation of a mixture comprising 89.7 volume per cent cyclopentane and 10.3 volume per cent neohexane, in a column having approximately 75 theoretical plates at a 45:1 reflux ratio results in inefficient separation of the hydrocarbons.

The data of this example indicate that neohexane and cyclopentane form an azeotrope since it is shown that the kettle product became more concentrated with respect to the more volatile component (cyclopentane) of the binary mixture in the early stages of distillation.

EXAMPLE I

Three hundred cc. of a mixture comprising 89.7 volume per cent cyclopentane and 10.3 volume per cent neohexane were charged to the kettle of a fractionating column. This column had a packed section 5 feet in length and a diameter of ½-inch. The packing was $\frac{1}{16}$-inch single-turn stainless steel helices. It is estimated that this column had approximately 75 theoretical plates. Conventional procedures were employed in the operation of this column. Data from this fractionation are recorded in Table I.

TABLE I

Straight fractionation of a mixture of cyclopentane and neohexane

[Reflux ratio 45/1. Charge: 300 cc. of 89.7 volume percent cyclopentane-10.3 volume percent neohexane.]

| Fraction | Cumulative Volume Overhead, cc. | Cumulative Volume Percent of Charge Overhead | $n_D^{20}$ of Fraction | Percent Cyclopentane by $n_D^{20}$ | B. P. Corr. to 760 mm. (°C.) (±0.2° C.) |
|---|---|---|---|---|---|
| 1 | 36 | 12.0 | 1.4015 | 87.4 | 49.1 |
| 2 | 63 | 21.0 | 1.4020 | 88.7 | 49.2 |
| 3 | 89 | 29.6 | 1.4020 | 88.7 | 49.2 |
| 4 | 116 | 38.7 | 1.4022 | 89.2 | 49.2 |
| 5 | 143 | 47.6 | 1.4025 | 90.0 | 49.2 |
| 6 | 176 | 58.7 | 1.4027 | 90.5 | 49.2 |
| 7 | 197 | 65.7 | 1.4030 | 91.3 | 49.2 |
| 8 | 214 | 71.4 | 1.4032 | 91.8 | 49.1 |
| 9 | 249 | 83.0 | 1.4035 | 92.6 | 49.2 |
| Kettle Residue | 31 | 10.3 | 1.4039 | 93.7 | |
| Distillation Loss | 20 | 6.7 | | | |
| Totals | 300 | 100.0 | | | |

In Example II it is shown that azeotropic fractionation of the same mixture using methyl formate as entrainer resulted in relatively effective separation of the hydrocarbons. About 30 per cent of the cyclopentane charged was recovered as a kettle product of above 98 volume per cent purity.

EXAMPLE II

Three hundred fifty cc. of a mixture containing 89.7 volume per cent cyclopentane and 10.3 volume per cent neohexane was added to 400 cc. of methyl formate. The resulting mixture was charged to the fractionation column described in Example I and fractionated at the same reflux ratio. Data from this fractionation are recorded in Table II.

TABLE II

Separation of cyclopentane from neohexane by azeotropic fractionation with methyl formate

[Charge: 350 cc. hydrocarbon, 400 cc. methyl formate. Reflux ratio: 45/1. Run No. 2030-14.]

| Cut No. | Overhead Temp. (°C.) Corr. to 760 mm. Pressure | Total Vol. of Cut, cc. | Vol. of Hydrocarbon in cut, cc. | Cumulative Vol. Percent Hydrocarbon O'head | Vol. Percent Neohexane in O'head (Entrainer Free) | Vol. Percent Cyclopentane in Kettle | Vol. Percent Entrainer in O'head | Increase in Kettle Purity over Initial Purity (Vol. Percent Cyclopentane) |
|---|---|---|---|---|---|---|---|---|
| 1 | 25.3 | 28 | 12.0 | 3.4 | 27.8 | 90.3 | 60 | 0.6 |
| 2 | 25.6 | 26 | 11.2 | 6.6 | 26.7 | 90.9 | 60 | 1.2 |
| 3 | 25.9 | 30 | 13.8 | 10.5 | 22.8 | 91.5 | 57 | 1.8 |
| 4 | 25.9 | 35 | 16.0 | 15.1 | 20.1 | 92.1 | 57 | 2.4 |
| 5 | 25.9 | 35 | 15.5 | 19.6 | 18.5 | 92.7 | 58 | 3.0 |
| 6 | 26.0 | 37 | 17.0 | 24.4 | 17.5 | 93.4 | 57 | 3.7 |
| 7 | 26.0 | 31 | 14.4 | 28.5 | 15.0 | 93.9 | 57 | 4.2 |
| 8 | 26.0 | 42 | 17.3 | 33.0 | 14.3 | 94.5 | 61 | 4.8 |
| 9 | 26.0 | 45 | 19.5 | 39.0 | 11.9 | 95.0 | 59 | 5.3 |
| 10 | 26.0 | 45 | 20.0 | 44.8 | 10.5 | 95.7 | 59 | 6.0 |
| 11 | 26.1 | 49 | 20.8 | 50.8 | 8.9 | 96.2 | 60 | 6.5 |
| 12 | 26.2 | 42 | 17.6 | 55.8 | 7.1 | 96.6 | 60 | 6.9 |
| 13 | 26.2 | 40 | 17.1 | 60.6 | 5.5 | 96.8 | 60 | 7.1 |
| 14 | 26.1 | 39 | 16.2 | 65.2 | 5.1 | 97.1 | 61 | 7.4 |
| 15 | 26.0 | 40 | 17.1 | 70.2 | 3.7 | 97.2 | 60 | 7.5 |
| 16 | 26.0 | 28 | 11.2 | 73.3 | 3.6 | 97.3 | 62 | 7.6 |
| Kettle Residue After Washing | | | 92.7 | | | 98.2 | | |

Although the examples given for the purpose of illustrating my invention refer to the purification of cyclopentane containing neohexane as an impurity, it will be apparent to one skilled in the art that purification of neohexane concentrates containing cyclopentane as an impurity may be accomplished by practice of this invention. For example, neohexane produced by the thermal alkylation of ethylene and isobutane contains small amounts of cyclopentane which may be removed from the neohexane in the manner prescribed by this invention.

I claim:
1. In the distillation of a mixture of cyclo- pentane and neohexane that improvement which comprises adding methyl formate to such mixture in amount less than the quantity required to form azeotropes with all hydrocarbons present but sufficient to form an azeotrope with all said neohexane, distilling the resulting mixture and recovering a cyclopentane-rich kettle product free from methyl formate.

2. A process for the separation of cyclopentane from a mixture consisting of cyclopentane and neohexane, comprising the following steps: fractionally distilling said mixture in the presence of an amount of methyl formate less than the quantity required to form the methyl formate azeotropes of all the said cyclopentane and neohexane present but at least sufficient to form such an azeotrope with said neohexane; withdrawing cyclopentane from said fractionation as the bottoms product; and withdrawing from said fractionation an overhead product comprising cyclopentane, neohexane and methyl formate.

3. A continuous process for the separation of cyclopentane from a mixture containing from 80 to 90 volume per cent cyclopentane and from 10 to 20 volume per cent neohexane, comprising the following steps; continuously fractionally distilling said mixture in the presence of an amount of methyl formate just sufficient to form azeotropes with all the hydrocarbon present in said mixture except a calculated quantity of cyclopentane; continuously withdrawing cyclopentane from said fractionation as bottoms product; and continuously withdrawing from said fractionation an overhead stream comprising cyclopentane, neohexane and methyl formate.

GARDNER C. RAY.

REFERENCES CITED

The following references are of record in the file of this patent:

UNITED STATES PATENTS

| Number | Name | Date |
|---|---|---|
| 2,186,524 | Frey et al. | Jan. 9, 1940 |
| 2,367,701 | Tooke | Jan. 23, 1945 |
| 2,368,050 | Tooke | Jan. 23, 1945 |
| 2,376,104 | Welling | May 15, 1945 |
| 2,382,119 | Welling | Aug. 14, 1945 |

OTHER REFERENCES

Mair et al., 27 Bureau of Standards Journal of Research, 44-54.